Oct. 24, 1967　　　　W. J. KARLEY　　　　3,348,826
VEHICLE MOUNTED AERATING DEVICE FOR MINNOW BUCKETS
Filed March 26, 1964

INVENTOR.
William J. Karley
BY
Sam J. Slotky
ATTORNEY 3,348,826
VEHICLE MOUNTED AERATING DEVICE FOR MINNOW BUCKETS
William J. Karley, Elmwood Trailer Park, Sioux Falls, S. Dak.
Filed Mar. 26, 1964, Ser. No. 354,995
2 Claims. (Cl. 261—121)

My invention relates to an aerating device for minnow buckets.

An object of my invention is to provide a device of this character which is readily and conveniently attachable to a vehicle window, and which includes features wherein the on-rushing air caused by the travel of the automobile will be concentrated under pressure to provide an aerating feature for the water in a minnow bucket, to thereby keep the minnows alive over a long period.

A further and important object of my invention is to provide such an arrangement which can be readily attached to either side of the automobile so that the device can be accommodated to different conditions at either side.

A further object of my invention is to provide features wherein the lower end of the tube entering the minnow bucket will be maintained at the necessary predetermined level.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1:
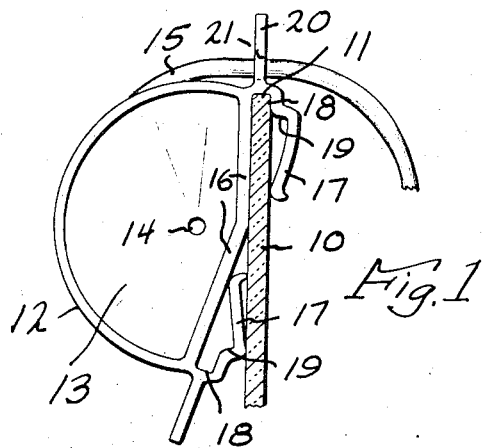
FIGURE 1 is a forward elevation of the principal portion of my device.
Figure 2:
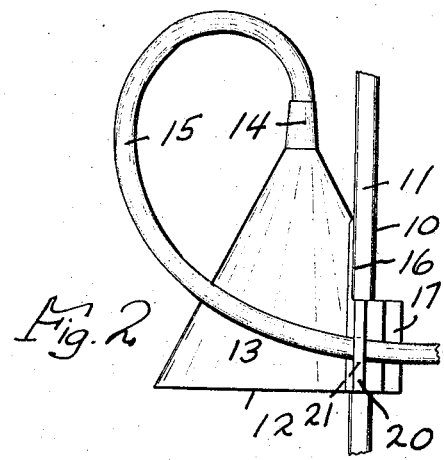
FIGURE 2 is a plan view of FIGURE 1.

My invention contemplates the provision of a certain funnel arrangement which can be attached to either side of an automobile, to thereby accommodate the wind or other conditions at either side and whereby the resultant compressed air provided by the arrangement will travel to a minnow bucket to aerate the same.

The present invention is co-pending with my further application entitled Vehicle Mounted Aerating Device for Minnow Buckets, Ser. No. 338,659, filed Jan. 20, 1964 and pertains to improvements of the same.

In describing my invention I have used the character 10 to designate the upper portion of a vehicle window glass which can be raised or lowered, the upper edge of the glass being indicated by the character 11.

The device of my invention comprises a substantially semi-circular funnel 12 having the rearwardly sloping sides 13 terminating in the portion 14 into which portion the end of a flexible tube 15 is inserted. The funnel member 12 includes the walls 16, it being noted that the walls 16 are angularly positioned with respect to each other, and I have further used the character 17 to indicate resilient clips which are formed integrally with the funnel members 12, and being made of resilient material for this purpose. The clips 17 include the recessed portions at 18 to accommodate a certain thickness of the pane 10, and further including a wider recessed portion at 19 to accommodate thicker panes.

Merging integrally with the clips 17 is an upper vertical flange 20 which includes a suitable opening at 21, this opening permitting the tube 15 to be bent backwardly and inwardly to thereby pass within the interior of the automobile to the minnow bucket. The flange 20 is adapted to be inserted within the upper felt-lined channel portion of the automobile door which normally receives the upper edge 11 of the pane 10.

Figure 4:
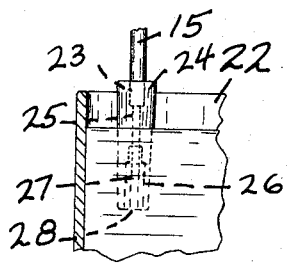
FIGURE 4 is a detail of the lower end of the tube.
Figure 5:
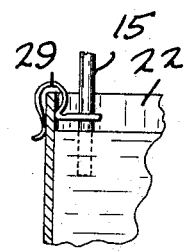
FIGURE 5 is a further detail.

The minnow bucket which can be placed any place desired in the vehicle is indicated generally by the character 22 (see FIGURES 4 and 5), and in one form of the device the lower end 23 of the flexible tube 15 is inserted with a buoyant cork member 24 having an opening 25, and attached to the lower end of the member 24 is the relatively heavy metal member 26 having the opening 27, this arrangement providing means whereby the float will be maintained in a vertical position to thereby maintain the tube 15 in a vertical position also and so that the lowermost opening 28 will not be too far beneath the surface of the water in the minnow bucket since if the opening is near the bottom of the bucket the hydraulic pressure will prevent the aerating action. FIGURE 5 illustrates a further modification with the character 29 indicating a further wire clip structure for providing a similar function.

I have found through experimentation that when the vehicle is traveling in a certain direction, and with the wind forces being in a certain direction, that the funnel device 12 will not function to provide the aerating feature at such conditions, however it will provide the aerating function if changed to the other side of the automobile.

Figure 3:
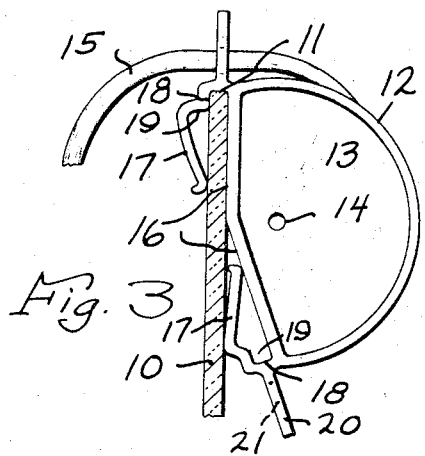
FIGURE 3 is a forward view of the device showing the arrangement attached to the opposite side of the vehicle.

Therefore by using the clips 17 as shown in FIGURE 1, or the opposite clip as shown in FIGURE 3, the arrangement can be accommodated to either side of the vehicle to thereby insure that the aerating action takes place.

Figure 6:
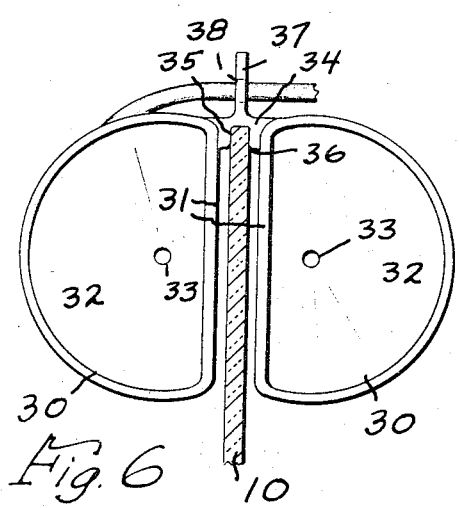
FIGURE 6 is a forward elevation of a modified form of the device.
Figure 7:
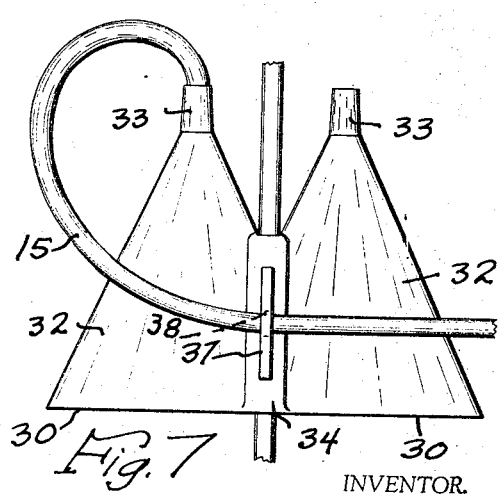
FIGURE 7 is a plan view of FIGURE 6.

FIGURES 6 and 7 illustrate a further modification for the same purpose and in this modification a pair of funnel members 30 are used having the flat sides 31 and the converging sides 32 terminating in the neck 33 for the reception of the tube 15 and in this form either funnel 30 can be used, or whichever funnel will operate, the other funnel being inoperable. For instance in FIGURES 6 and 7 the left-hand funnel 30 will be functioning. Merging integrally with the funnels 32 is a transverse flange 34 having the recessed portion 35 and the wider portions at 36 to accommodate different pane thicknesses, the character 37 indicating a vertical flange having the opening at 38 for the same purpose as above described.

It will now be noted that I have provided the various advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. An aerating device for minnow buckets comprising a funnel member, said funnel member being of substantially semi-conical shape and having a flat side wall, said funnel member being adapted to be attached to the upper edge of a vehicle window pane, said flat wall being adapted to rest against said pane, an integral clip member extending from said funnel member and receiving said pane upper edge, said flat side wall including a further integral portion extending angularly therefrom, said further integral portion including a further integral clip extending therefrom, said clips including flanges having openings, a lengthened tube received in either of said openings, a minnow bucket to which said tube communicates, said tube communicating to said funnel member.

2. An aerating device for minnow buckets comprising a pair of opposed semi-conical funnels, said funnels having flat walls parallel to each other and adapted to receive a vehicle window pane therebetween, said funnels having reduced end openings, a support portion extending from said funnels having a groove for receiving a portion of the upper edge of said pane, a flange having an opening extending from said support portion, a tube for attachment to either of said reduced end openings, a minnow bucket to which said tube communicates.

References Cited

UNITED STATES PATENTS

| | | |
|---|---|---|
| 1,991,149 | 2/1935 | Haislip. |
| 2,680,646 | 6/1954 | Bush. |
| 2,822,156 | 2/1958 | Horton. |
| 2,970,456 | 2/1961 | Rice. |
| 3,196,576 | 7/1965 | Thomas _____ 43—56 |

HARRY B. THORNTON, *Primary Examiner.*

E. H. RENNER, *Assistant Examiner.*